Figure 1:
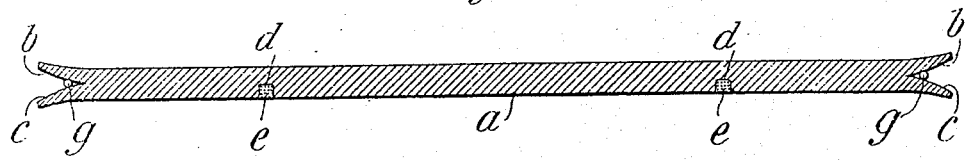

No. 807,264. PATENTED DEC. 12, 1905.
E. T. GREENFIELD.
METAL TUBE.
APPLICATION FILED DEC. 12, 1904.

WITNESSES:
C. E. Ashley
M. F. Keating

INVENTOR
Edwin T. Greenfield
By his Attorney,
Charles J. Kintner

UNITED STATES PATENT OFFICE.

EDWIN T. GREENFIELD, OF MONTICELLO, NEW YORK.

METAL TUBE.

No. 807,264.     Specification of Letters Patent.     Patented Dec. 12, 1905.

Application filed December 12, 1904. Serial No. 236,586.

*To all whom it may concern:*

Be it known that I, EDWIN T. GREENFIELD, a citizen of the United States, residing at Monticello, county of Sullivan, and State of New York, have made a new and useful Invention in Metal Tubes, of which the following is a specification.

My invention is directed particularly to improvements in metal tubes formed from iron or other skelps; and it has for its objects, first, to construct a tube of this nature with an absolutely steam and gas tight seam or joint, and, second, to construct such a tube with an interior lining integral with the face thereof which shall be substantially non-oxidizable.

Prior to my invention it was old in the art to construct skelp-bent or skelp-drawn tubes by welding the seam or joint after the tube had been formed. It was also old, broadly, to effect a steam-tight joint by brazing the edges together, but, so far as I am aware, not without material waste of the brazing material.

My invention therefore consists in the novel tube hereinafter described, and illustrated in the accompanying drawings.

In a prior application, bearing Serial No. 219,606, filed in the United States Patent Office on the 5th day of August, 1904, I have disclosed a method of and means for making tubes from metal skelps by drawing the same through successive forming-rolls and simultaneously embedding in the outer face thereof one or more strips of brazing material whereby the completed tube may be surrounded by a screw-thread and integrally brazed to the body thereof, my intention being at the time that the aforesaid invention was completed to provide sufficient brazing material not only to secure the thread to the body of the tube, but also to unite the adjoining edges of the completed tube together, so as to constitute a steam and gas tight tube. I have ascertained in practice, however, that when the tube is constructed in accordance with the before-mentioned process the brazing material escapes through the seam and into the interior of the tube, and, furthermore, such a method or process as therein described necessitates the use of a greater amount of brazing material than would be required to manufacture a simple tube without a surrounding screw-thread. It was therefore with a view of providing a skelp-drawn tube which should have the seam at the adjoining edges thereof effectually sealed by a strip of metal brazed thereto and also with a further view of utilizing a portion of the brazing material for the purpose of coating the interior of the tube with a relatively non-oxidizable integral lining that the present invention was devised. Tubes of this nature have an especial utility in connection with electric wiring in buildings, &c., the rules of the boards of fire underwriters now requiring generally that metal armor-tubes which surround electric wires shall be interiorly comparatively non-oxidizable.

My invention will be fully understood by referring to the accompanying drawings, in which—

Figure 2:
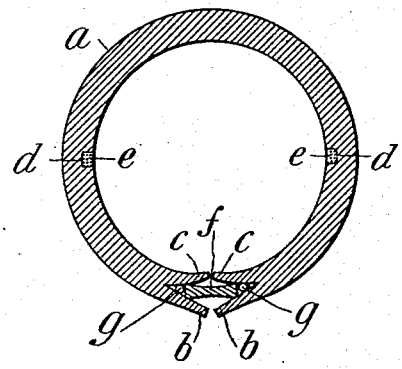
Figure 3:
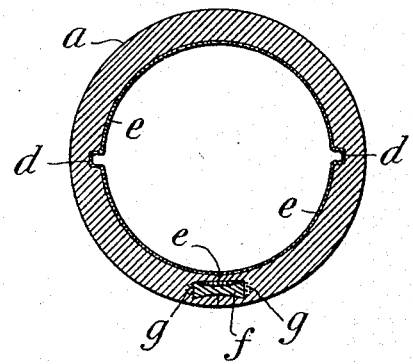

Figure 1 represents a metal skelp having two grooves in its lateral edges and two grooves in one face with brazing material embedded therein. Fig. 2 represents a cross-section of a partially-completed tube constructed from the skelp illustrated in Fig. 1, a sectional view being also shown of a metal sealing-strip located in position for effectually sealing the seam. Fig. 3 represents a similar sectional view of a completed tube with the brazing material as it appears after the tube has been subjected to heat and pressure, illustrating also the lining of non-oxidizable brazing material in position and integral with the inner face of the tube.

The method of constructing this tube is as follows: A metal skelp is passed through a machine having laterally-disposed V-shaped rollers like those disclosed in my before-mentioned application for giving to its lateral edges V-shaped grooves, so that the outer or extended portions thereof assume the construction illustrated at $b$ and $c$, for a purpose to be hereinafter described. Simultaneously additional grooves $d$, one or more in number, preferably two, are cut by one or more rapidly-rotating saws or V-shaped scoring-rolls at such points as may be most advisable, preferably so that they will be ninety degrees from the seam when the tube is partially completed, as shown in Fig. 2. After the several grooves have been formed in the sides and face of the skelp brass or other brazing wires $g$ are embedded in the lateral grooves, and similar wires or strips of brazing material $e$ are embedded in the grooves $d$ and firmly secured therein prior to the forming of the skelp into tubular shape, said brazing wires or strips having been previously passed through a liquid flux, as disclosed in a prior patent granted to me on the 5th day of May, 1903, and numbered 727,128. The skelp is then passed through a skelp-bender or tube-forming machine for forming tubes from skelps—such, for instance, as is disclosed in my before-mentioned application—in such manner as to inclose the grooves $d$ and their containing brazing material within the tube. At the same time a sealing-strip $f$ of metal, preferably of the conformation shown in Fig. 2 of the drawings and of the same material as that of the tube, is guided into position between the projections $c$ and $b$, the structure up to this point being substantially as illustrated in Fig. 2. In the succeeding steps of formation it is subjected to the action of an internally-disposed mandrel and one or more externally-disposed rolls in a manner well understood by those skilled in the art of tube-drawing, so as to firmly force the internally-disposed projections $c$ $c$ outward and the externally-disposed projections $b$ $b$ inward and give to the tube complete cylindrical formation. It is then brought to white heat in a furnace for a definite length of time with the seam downwardly located in such manner as to enable the brazing material $e$ to accumulate in the lower side of the tube and permeate the seam, so as to thereby seal it in the manner shown in Fig. 3. At the same time the fused material from the wires $g$ effectually seals the joint at the sides of the strip $f$. The tube is now rotated for a definite length of time while it is allowed to cool, thus forming within the interior surface thereof a relatively non-oxidizable coating, as clearly shown in Fig. 3, it being understood, of course, that the grooves $d$ are of such depth and width as to contain sufficient material for this purpose, the dimensions of said grooves being regulated by the thickness of the lining it is desired to place within the inner surface.

I am aware that it has been heretofore proposed to dispose a strip of brazing material covered with a flux between the adjoining edges of a skelp-drawn tube and afterward heat the same to such an extent as to effectually braze the adjoining parts together, and I make no claim hereinafter broad enough to include such a tube, my most generic claim in this particular being directed to a skelp-drawn tube in which the adjoining edges are firmly secured together by a sealing-strip, preferably of the same metal as that of which the tube is constructed.

I do not limit the product herein disclosed to the especial details of construction whereby it is produced, as these might be materially departed from and still come within the sco of my claims hereinafter made. I believe is broadly new with me to effect the closur of the seam of a skelp-bent or skelp-drawn tube by embedding a sealing-strip in grooves in the lateral edges thereof as it is bent and to effectually confine the same securely therein in the manner shown in Fig. 3 of the drawings, whether the same be brazed or not. I believe it is also broadly new with me to effect the junction of the adjoining edges of a skelp-bent or skelp-drawn tube by providing a sealing-strip between said edges and embedded therein and effecting a steam and gas tight sealing of the same through the agency of a brazing material located within the tube whereby none of the brazing material is allowed to escape and also that it is new with me to simultaneously braze the adjoining edges of a skelp-bent or skelp-drawn tube and line the interior thereof with a substantially non-oxidizable medium.

Although I prefer to use a flux as described, this is not always necessary.

Having thus described my invention, what I claim, and desire to secure by Letters Patent of the United States, is—

1. A tube formed from a skelp of metal having a sealing-strip embedded in grooves in the adjoining edges.

2. A tube formed from a skelp of metal having a sealing-strip embedded in triangular grooves in the adjoining edges and integrally united thereto by brazing material.

3. A tube formed from a skelp of metal having a sealing-strip embedded between the adjoining edges, the interior of said tube and the adjacent interior parts of the edges and sealing-strip being lined with brazing material.

4. A tube formed from a skelp of metal having a sealing-strip embedded between the adjoining edges, the tube being coated throughout its interior with a relatively non oxidizable metal.

5. A tube formed from a skelp of metal having a sealing-strip embedded between the adjoining edges, said tube being interiorly lined with a relatively non-oxidizable metal and the adjoining edges of the tube and the sealing-strip also coated with brazing material.

6. A tube formed from a skelp of metal having its edges connected together by a sealing-strip and a fusible brazing metal.

7. A tube formed from a skelp of metal having its edges connected together by a sealing-strip $f$ of greater thickness at its lateral edges than at its center, the edges of the sealing-strip being embedded in the adjoining edges of the tube and all of said parts firmly locked together.

8. A tube formed from a skelp of metal having its edges united together by a locking-strip of metal, the lateral edges of the lockingbeing securely embedded in the adjoining edges of the tube.

A tube formed from a skelp of metal having its edges united together by a locking-strip of metal, the lateral edges of the locking-strip being securely embedded in the adjoining edges of the tube and united together by a brazing material.

In testimony whereof I have signed my name to this specification in the presence of two subscribing witnesses.

EDWIN T. GREENFIELD.

Witnesses:
C. J. KINTNER,
M. T. KEATING.